Dec. 22, 1970   U. RIOS   3,548,498
AUTOMATIC BUTTER-PAT DISPENSING MACHINE
Filed April 1, 1969   5 Sheets-Sheet 4
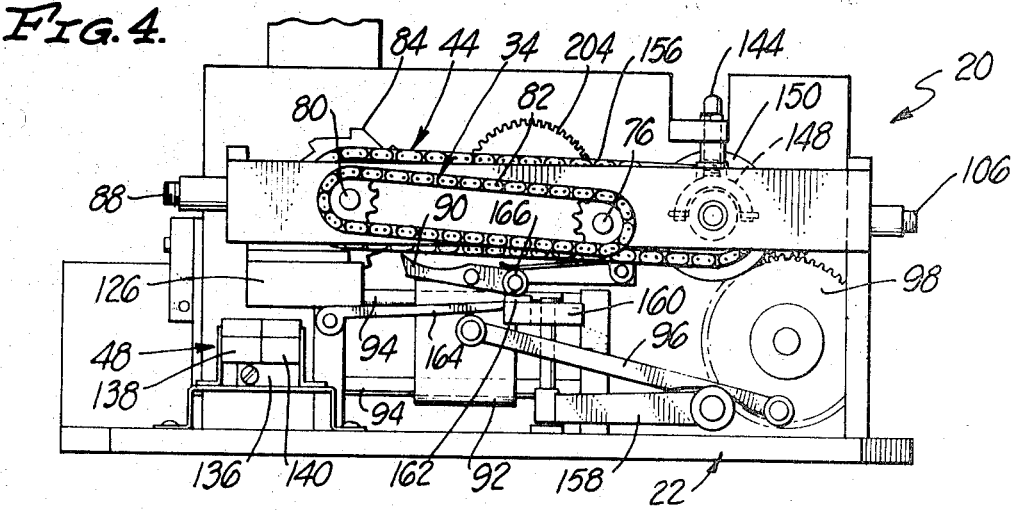
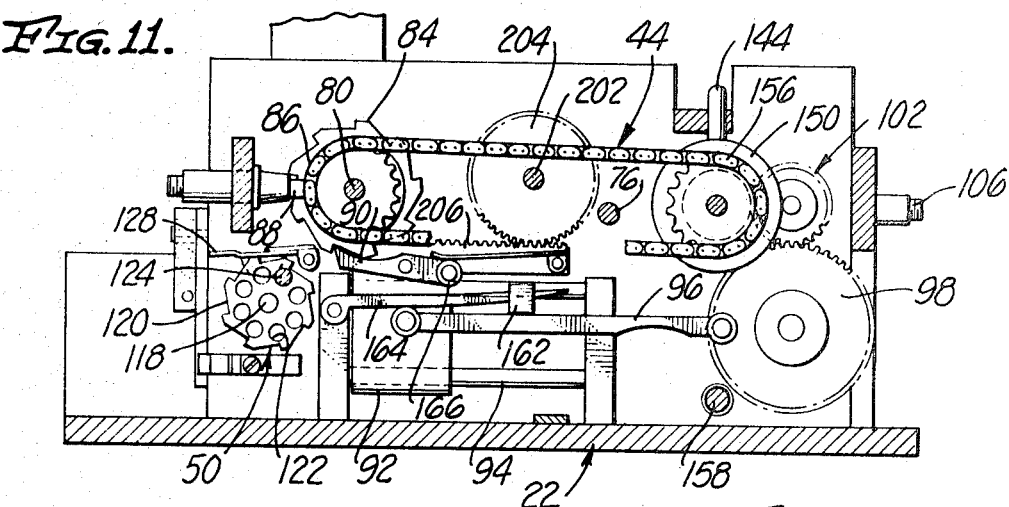
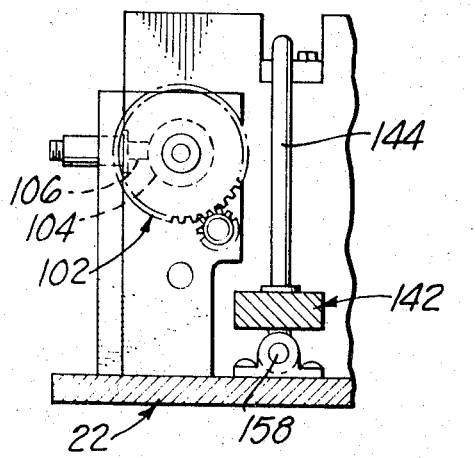
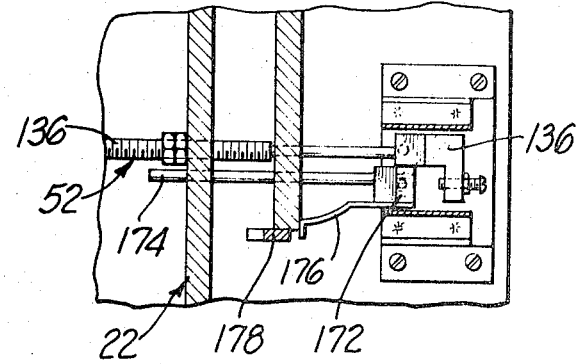
INVENTOR
URBAN RIOS
BY HIS ATTORNEYS
HARRIS, KIECH, RUSSELL & KERN Dec. 22, 1970   U. RIOS   3,548,498
AUTOMATIC BUTTER-PAT DISPENSING MACHINE
Filed April 1, 1969   5 Sheets-Sheet 5
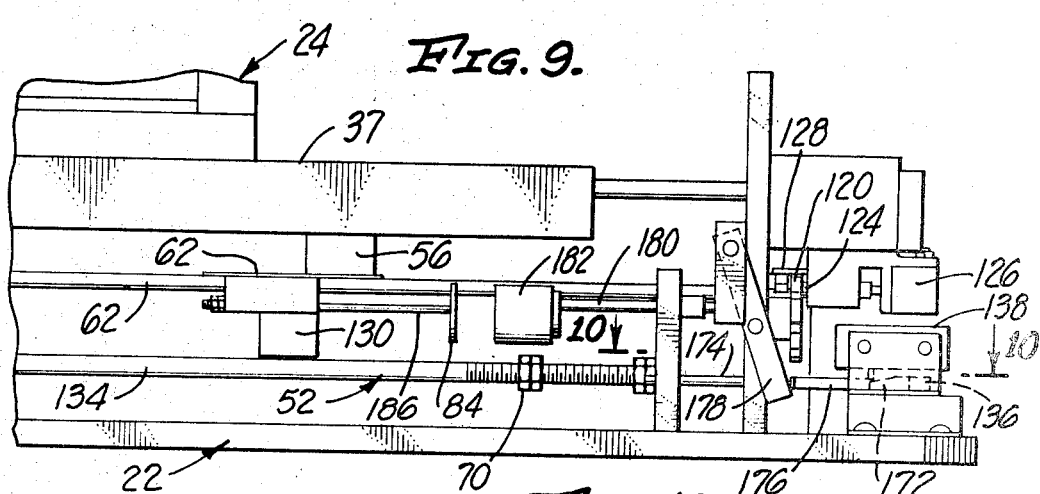
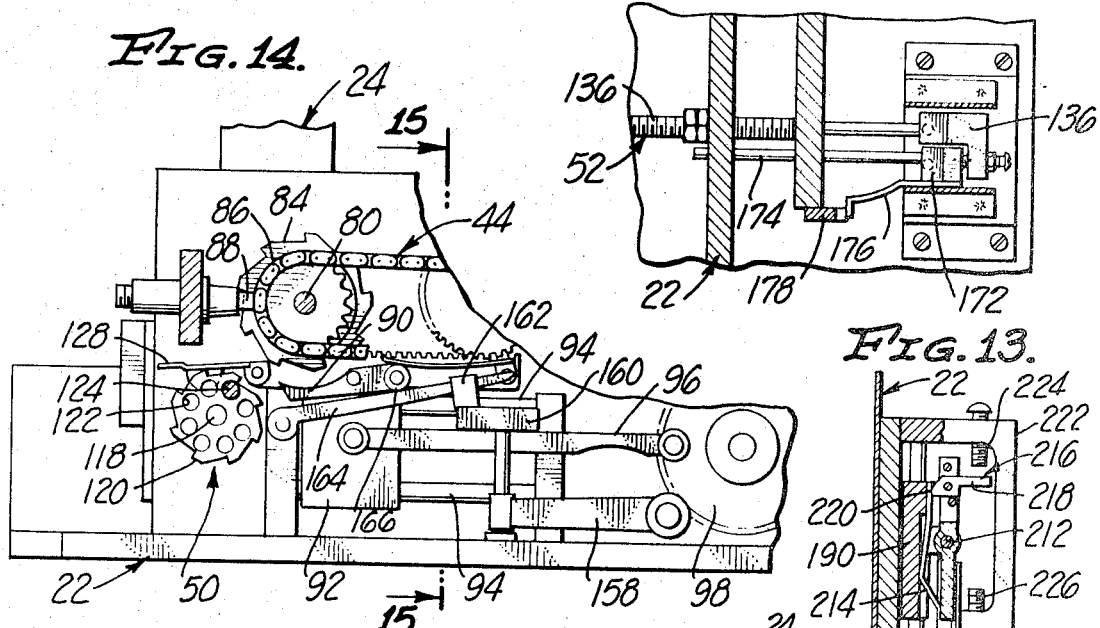
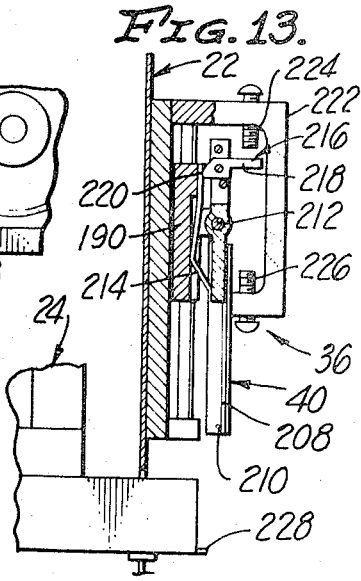
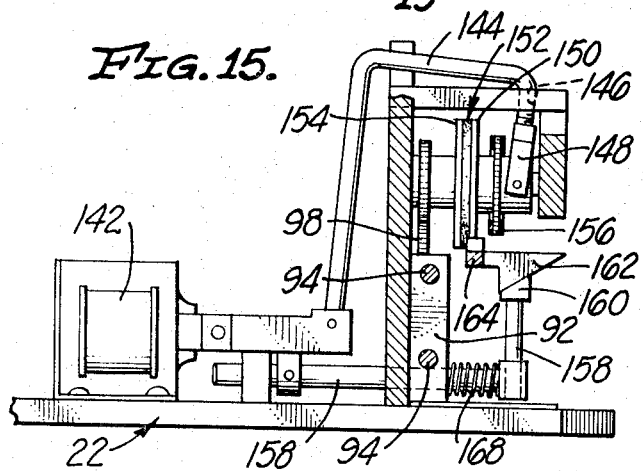
INVENTOR
URBAN RIOS
BY HIS ATTORNEYS
HARRIS, KIECH, RUSSELL & KERN

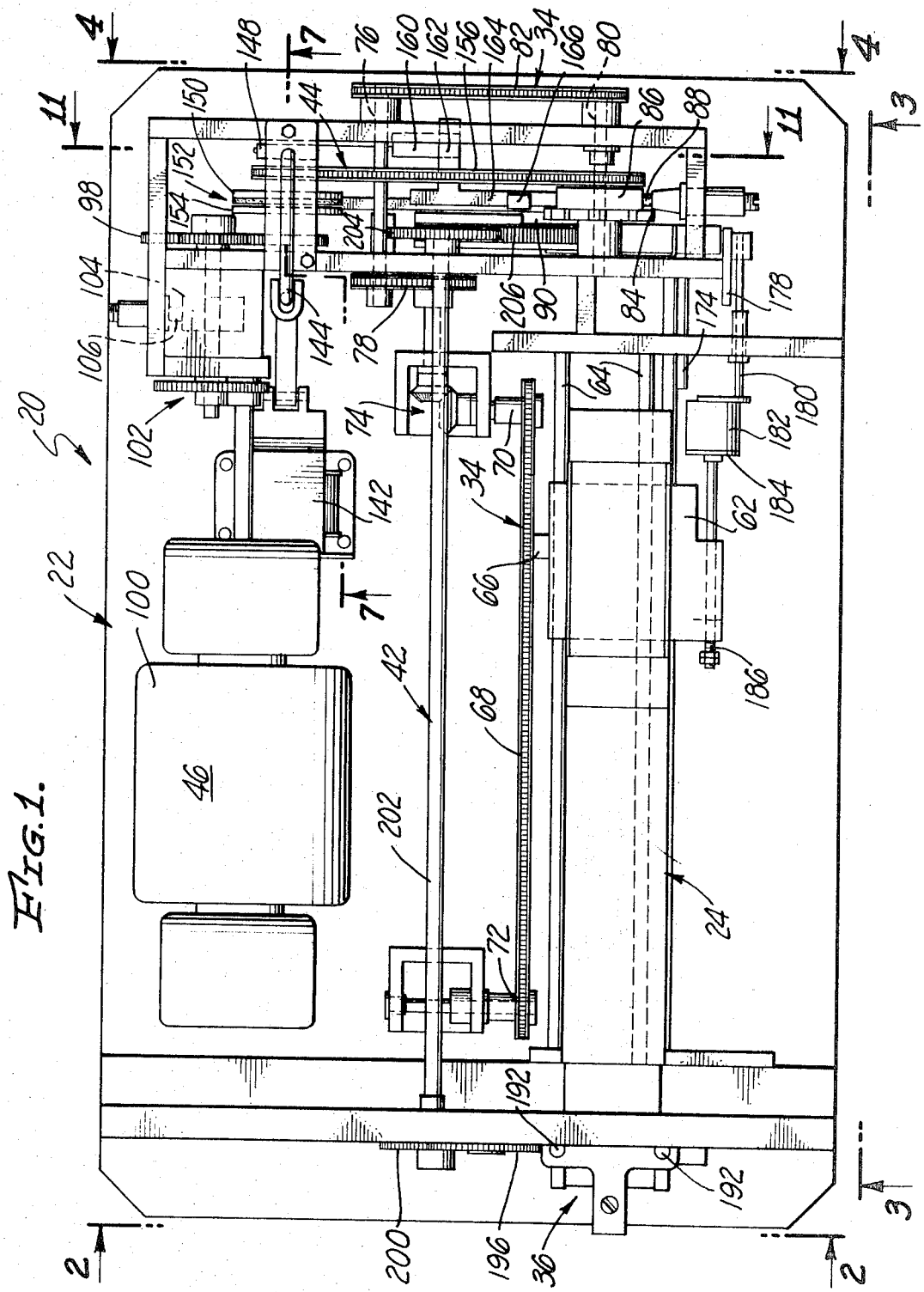

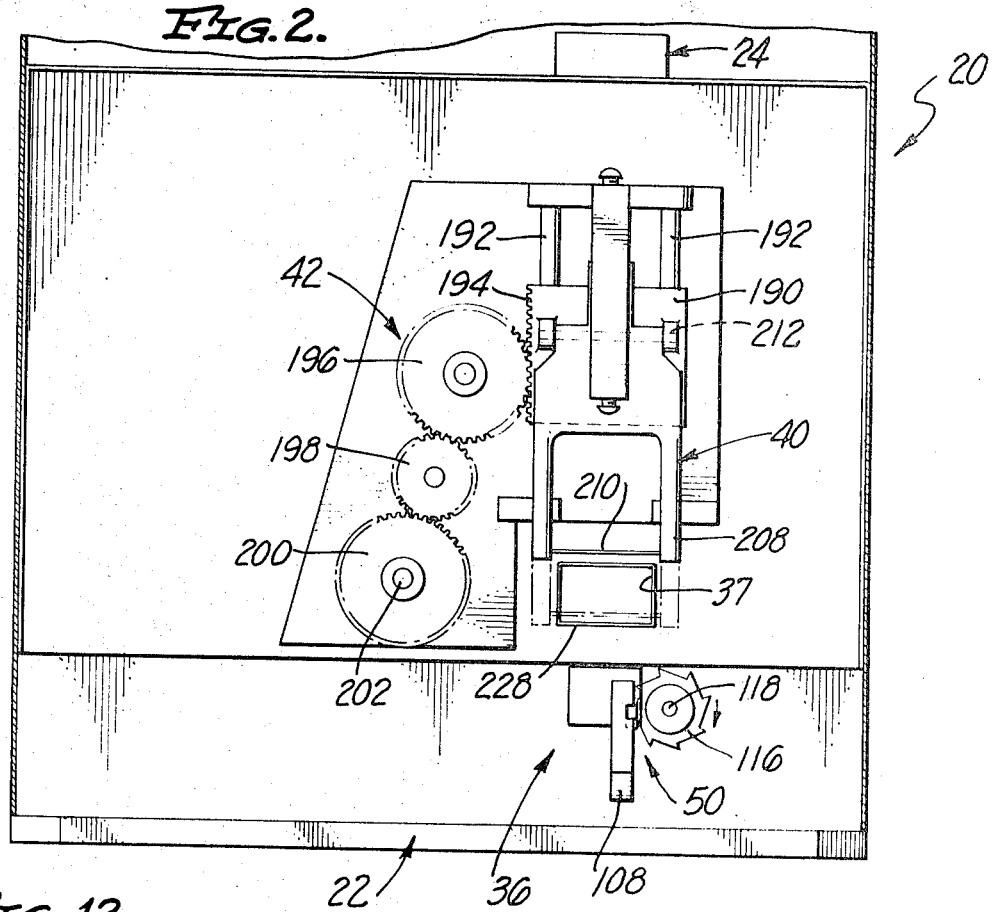
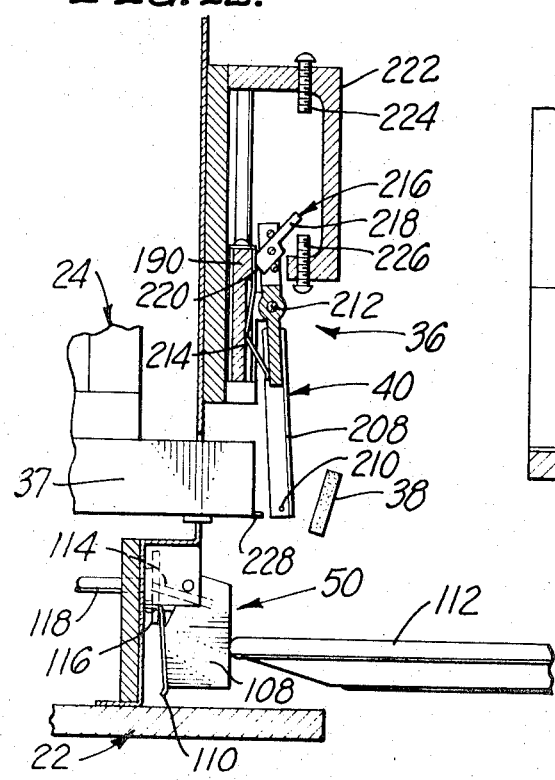
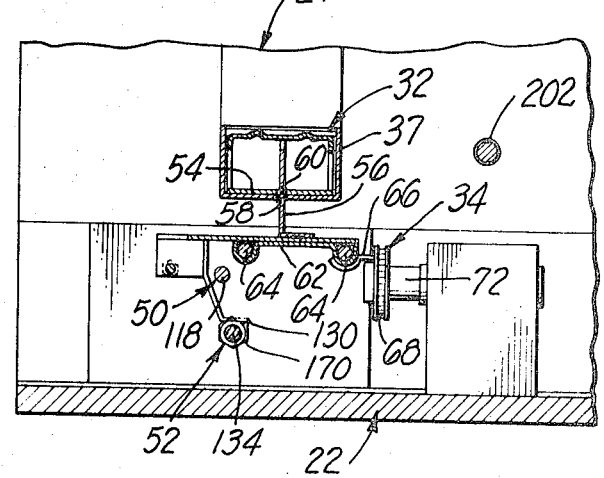

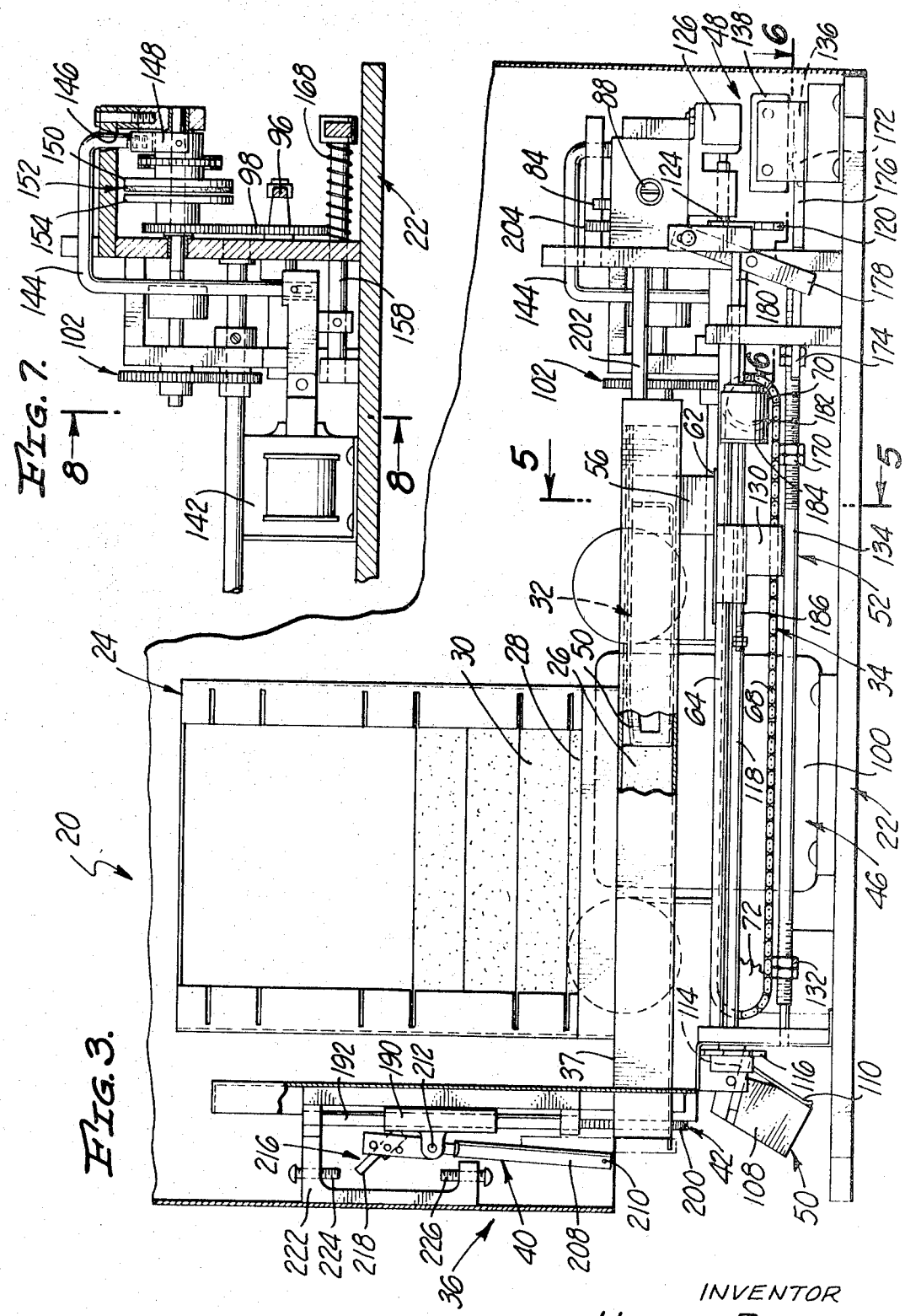

United States Patent Office 3,548,498
Patented Dec. 22, 1970

---

3,548,498
AUTOMATIC BUTTER-PAT DISPENSING MACHINE
Urban Rios, San Pedro, Calif., assignor, by mesne assignments, to American Buttermaster Corporation, Long Beach, Calif., a corporation of California
Filed Apr. 1, 1969, Ser. No. 812,032
Int. Cl. A01j *21/00*
U.S. Cl. 31—5                                           10 Claims

ABSTRACT OF THE DISCLOSURE

An automatic machine for dispensing pats of butter from elongated blocks or sticks. The elongated blocks are disposed horizontally in a stack in a refrigerated magazine. The lowermost block is advanced to a cutting station in a step-by-step manner by a ram engaging one end of the block. A cutter at the cutting station cuts pats of butter from the block, the thickness of each pat corresponding to the length of each step of movement of the block. After the ram has completed its stroke, it is returned to an initial position to permit the next lowermost block of butter in the magazine to drop into alignment with the ram. The ram is intermittently advanced and returned, and the cutter is intermittently actuated, by an electric motor under the control of a selector system which causes the electric motor to operate the cutter actuator and the ram drive on demand at the end of a step of advance movement of the ram, and to operate the ram return at the end of a predetermined number of steps of advance movement of the ram. This selector system includes a manual control at the cutting station, which manual control is engageable by a dish or plate to cause the electric motor to actuate the cutter to dispense one pat of butter, and to advance the ram one step to move the block into position to dispense another pat.

BACKGROUND OF INVENTION

The present invention relates to a butter-pat dispenser and, more particularly, to a machine which cuts pats of butter from elongated blocks or sticks on demand, and deposits them on plates, or the like, for service to restaurant customers.

More particularly, the invention contemplates a butter-pat dispenser of the type which includes a refrigerated magazine adapted to contain a stack of elongated blocks or sticks of butter with the blocks horizontal. The lowermost block is advanced step-by-step to a cutting station where pats of butter are cut off and deposited on serving plates. With a butter-pat dispenser of this general type, the use of preformed blocks of butter avoids the problems of liquid expression encountered with extrusion-type machines, and positive horizontal movement of the block from which pats are being dispensed avoids the problem of sticking encountered with downward block movement under the influence of gravity.

Still more specifically, the present invention contemplates an automatic machine for dispensing pats of butter from elongated blocks, comprising: a magazine adapted to contain a stack of elongated blocks of butter with the blocks horizontal; ram means engageable with one end of the lowermost block of butter in the magazine; ram drive means for advancing the ram means horizontally from an initial position toward a cutting station in a step-by-step manner so as to advance a block of butter engaged by the ram means from the magazine toward the cutting station in a step-by-step manner; cutter means at the cutting station for cutting a pat of butter from an end of a block advanced to the cutting station by the ram means; cutter-actuating means for actuating the cutter means after a step of advance movement of the ram means; and ram return means for returning the ram means to its initial position, after the ram means has been advanced a predetermined number of steps to correspond to the length of a block of butter, to permit the next lowermost block of butter in the magazine to drop into a position to be engaged by the ram means.

SUMMARY AND OBJECTS OF THE INVENTION

With the foregoing as a background, a primary object of the invention is to provide a butter-pat dispensing machine of the foregoing nature which automatically dispenses a pat of butter on demand substantially instantaneously and with a minimum of manual effort.

More particularly, an important object of the invention is to provide an automatic butter-pat dispensing machine which includes electric motor means for operating the ram drive means, the cutter-actuating means and the ram return means, and which includes selector means for causing the electric motor means to operate the cutter-actuating means and the ram drive means on demand at the end of a step of advance movement of the ram means, and to operate the ram return means at the end of a predetermined number of steps of advance movement of the ram means, corresponding to the length of a block of butter.

Still more particularly, another important object of the invention is to provide a selector means which includes manually operable control means at the cutting station for causing the electric motor means to operate the cutter-actuating means and the ram drive means, and another control means responsive to a predetermined number of steps of advance movement of the ram means for causing the electric motor means to operate the ram return means. A related object is to provide a manually operable control means which is actuable simply by pressing the edge of a dish or plate thereagainst.

With the foregoing construction, whenever the person operating the machine desires the dispensing of a pat of butter, it is merely necessary to press the edge of a dish or plate against the manually operable control means, the remainder of the operation of the machine being entirely automatic and being carried out by the electric motor means to require a minimum of effort from the operator.

Another object of the invention is to provide an automatic butter-pat dispensing machine wherein the selector means includes means for disengaging the ram drive means while the ram return means is in operation, and for disengaging the ram return means while the ram drive means and the cutter-actuating means are in operation. Thus, while the ram means is being returned to its initial position to pick up another block of butter, the ram drive means for advancing the ram means is inoperative.

A further object of the invention is to provide a cutter means having means for displacing each butter pat away from the block of butter as it is cut therefrom to insure complete separation.

Other objects are to provide a machine which requires no contact between the operator's hands and the butter, and which maintains the butter at a temperature for easy spreading.

The foregoing objects, advantages, features and results of the present invention, together with various other objects, advantages, features and results which will be evident to those skilled in the butter-pat dispensing art in the light of this disclosure, may be achieved with the exemplary embodiment of the invention described in detail hereinafter and illustrated in the accompanying drawings.

DESCRIPTION OF DRAWINGS

FIG. 1 is a plan view of an automatic butter-pat dispensing machine of the invention, with the outer housing or case of the machine removed for clarity;

FIG. 2 is an end view of the machine, taken as indicated by the arrowed line 2—2 of FIG. 1;

FIG. 3 is a side elevational view of the machine, taken as indicated by the arrowed line 3—3 of FIG. 1;

FIG. 4 is an end elevational view taken as indicated by the arrowed line 4—4 of FIG. 1;

FIGS. 5 and 6 are fragmentary sectional views respectively taken as indicated by the arrowed lines 5—5 and 6—6 of FIG. 3;

FIG. 7 is a fragmentary sectional view taken as indicated by the arrowed line 7—7 of FIG. 1;

FIG. 8 is a fragmentary sectional view taken as indicated by the arrowed line 8—8 of FIG. 7;

FIG. 9 is a fragmentary side elevational view duplicating a portion of FIG. 3, but showing certain parts in different positions;

FIG. 10 is a fragmentary sectional view taken as indicated by the arrowed line 10—10 of FIG. 9;

FIG. 11 is a transverse sectional view taken as indicated by the arrowed line 11—11 of FIG. 1;

FIG. 12 is a fragmetnary vertical sectional view similar to the left end of FIG. 3, but showing various parts in different positions;

FIG. 13 is a view similar to FIG. 12, but showing various parts in still different positions;

FIG. 14 is a view similar to a portion of FIG. 11, but showing certain parts in different positions; and FIG. 15 is a view taken as indicated by the arrowed line 15—15 of FIG. 14.

DESCRIPTION OF EXEMPLARY EMBODIMENT OF INVENTION

Considering the invention generally initially, the automatic butter-pat dispensing machine thereof is designated generally in FIGS. 1 to 4 of the drawings by the reference numeral 20 and includes a supporting structure 22 carrying the following major components: a magazine 24, FIGS. 1 and 3, adapted to contain a stack of elongated blocks 26, 28, 30, etc., of butter which are oriented horizontally, and longitudinally of the supporting structure, and which are adapted to be maintained at a reduced temperature by a suitable refrigerating means, not shown; ram means 32, FIG. 3, engageable with one end of the lowermost block 26 of butter in the magazine; ram drive means 34, FIG. 1, for advancing the ram means horizontally from an initial position, to the right of the position shown in FIG. 3, toward a cutting station 36, FIG. 3, in a step-by-step manner so as to advance the butter block 26 along a guideway 37 from the magazine 24 toward the cutting station in a step-by-step manner, the length of each increment of advance movement of the butter block being selected to equal the thickness desired for a pat 38, FIG. 12, to be cut therefrom at the cutting station; cutter means 40 at the cutting station for cutting a pat of butter, such as the pat 38, from the end of the block 26 advanced to the cutting station by the ram means 32; cutter actuating means 42 for actuating the cutter means 40 after a step of forward or advance movement of the ram means 32; ram return means 44 for returning the ram means 32 to its initial position, after the ram means has been advanced a predetermined number of steps corresponding to the number of butter pats in the block 26, to permit the next block 28 to drop into the guideway 37 so that the next butter block can be engaged by the ram means 32 and advanced step-by-step toward the cutting station 36; electric motor means 46 for operating the ram drive means 34, the cutter actuating means 42 and the ram return means 44; selector means 48 for causing the electric motor means to operate the cutter actuating means and the ram drive means on demand at the end of a step of advance movement of the ram means, and to operate the ram return means automatically at the end of a predetermined number of steps of advance movement of the ram means; the selector means 48 including manually operable control means 50, FIG. 3, at the cutting station 36 for causing the electric motor means 46 to operate the cutter actuating means 42 and the ram drive means 34; and the selector means 48 also including another control means 52 responsive to a predetermined number of steps of advance movement of the ram means 32 for causing the electric motor means 46 to operate the ram return means 44 to permit the next block 28 of butter to drop from the magazine 24 into the guideway 37 forming part of such magazine.

To facilitate cleaning, and to facilitate maintenance in a sanitary condition, all parts of the dispensing machine 20 which contact the butter blocks 26, 28, 30, etc., during their storage in the magazine 24 and during their step-by-step advance movement through the guideway 37 by the ram means 32, are removable as a unit. More particularly, the magazine 24 and the guideway 37 forming part thereof are rigidly interconnected, and suitably rigidly mounted on the supporting structure 22, in a manner not specifically shown. The ram means 32 includes a ram 54 slidable longitudinal of the guideway 37 and quickly and easily engageable with and disengageable from the ram drive means 34 in a manner to be described. Thus, the magazine 24, the guideway 37 forming part thereof, and the ram 54 slidable in the guideway, are all easily removable and reinstallable as a unit so that these parts, which are all of the parts coming in contact with the butter blocks, can be cleaned and maintained in a sanitary condition readily.

Considering the ram drive means 34, it comprises a laterally-thin ram driver 56 which extends upwardly through an elongated longitudinal slit 58, FIG. 5, in the bottom wall of the guideway 37 and into a complementary socket 60 in the ram 54. With this construction, the magazine 24, its guideway 37 and the ram 54 may be removed merely by lifting them out of engagement with the ram driver 56, reinstallation being effected by reversing this operation.

As perhaps best shown in FIGS. 1 and 5, the ram driver 56 is mounted on a carriage 62 which is slidable longitudinally toward and away from the cutting station 36 on rods 64. The carriage 62 is connected, at 66, to the upper run of an endless chain 68 paralleling the guide rods 64 and trained around sprockets 70 and 72 respectively adjacent the initial position of the ram 54 and the cutting station 36.

As best shown in FIG. 1, bevel gearing 74 drives the sprocket 70 in either direction, the bevel gearing being driven from a shaft 76 through a chain 78 trained around suitable sprockets. The shaft 76 is driven from a shaft 80 through a chain 82 trained around suitable sprockets on the shafts 76 and 80. As will be explained hereinafter, when the ram drive means 34 is in operation, the shaft 80 is driven in a step-by-step manner in one direction to advance the ram 54 step-by-step from its initial position toward the cutting station 36. When the ram 54 reaches the end of its stroke, the shaft 80 is driven continuously in the opposite direction by the ram return means 44 to return the ram to its initial position.

The ram drive means 34 includes ratchet-and-pawl means which, as best shown in FIG. 1, comprises a ratchet wheel 84 fixed on the shaft 80 and provided with a hub 86 frictionally engaged by an adjustable brake 88 to prevent overrunning. As best shown in FIG. 11, a spring-biased pawl 90 is engageable with the ratchet wheel 84 to advance the ratchet wheel step-by-step in a direction to advance the ram 54 in a step-by-step manner, through the interconnections hereinbefore described.

The pawl 90 is mounted on a crosshead 92 slidable laterally of the axis of the ratchet wheel 84 on guide rods 94. The crosshead 92 is driven by an eccentric means comprising a connecting rod 96 pivoted to the crosshead and to a point adjacent the periphery of a main drive gear 98 which makes one revolution for each step of advance movement of the ratchet wheel 84 and the ram 54.

The electric motor means 46 comprises an electric motor 100 which is mounted on the supporting structure 22 and which is connected to the main drive gear 98 through a suitable reduction gear train 102, the latter reducing the motor speed to a value suitable for the main drive gear. Rigidly mounted on one of the shafts of the reduction gear train 102 is a hub 104, FIG. 1, frictionally engageable by an adjustable brake 106 to minimize coasting of the electric motor 100.

Considering the manner in which the ram drive means 34 is intermittently energized to advance the ram 54, and the butter block 26 engaged thereby, in a step-by-step manner, the manually operable control means 50 at the cutting station 36 includes a control lever 108 which, as best shown in FIG. 12, is pivotable inwardly against a biasing spring 110 by an edge of a dish or a plate 112 located below the cutter means 40 in a position to receive a butter pat 38 cut from the butter block 26. The control lever 108 operates a ratchet-and-pawl means comprising a pawl 114 engageable with a ratchet wheel 116, FIG. 2, on a shaft 118, FIG. 3, extending substantially the full length of the machine 20. As best shown in FIGS. 9, 11 and 14, the shaft 118 is provided on its other end with a rotary switch actuator 120 in the form of a ratchet wheel having in an end face thereof circumferentially spaced detent recesses 122 adapted to receive a detent 124 permitting opening of a switch 126 controlling the electric motor 100. The rotary switch actuator 120 is engaged by an auxiliary spring-biased pawl 128 carried by the crosshead 92, as best shown in FIG. 14.

With the foregoing construction, when a butter dish 112 is pressed against the control lever 108 to pivot it from the position shown in FIG. 3 to that shown in FIG. 12, the pawl 114 advances the ratchet wheel 116 sufficiently to advance the rotary switch actuator 120 enough to force the detent 124 out of the edtent recess 122 in which it was disposed. This closes the twich 126 to energize the motor 100, whereupon the main drive gear 98 rotates through one revolution in the counter-clockwise direction, as viewed in FIG. 4, to move the crosshead 92 through one complete stroke, from the position shown in FIG. 4. As viewed in FIG. 11, during leftward movement of the crosshead 92, the pawl 90 advances the ratchet wheel 84 one step, thereby advancing the ram 54, and the butter block 26 engaged thereby, one step. At the same time, the pawl 128 on the crosshead 92 advances the rotary switch actuator 120 one step so that the detent 124 enters the next detent recess 122 to open the switch 126 and de-energize the electric motor 100. This occurs, as shown in FIG. 11, near the end of a full revolution of the main drive gear 98 so that the system coasts to the rest position of FIG. 4.

It will thus be apparent that each time the manually operable control lever 108 is pivoted inwardly by a butter dish 112, the ram drive means 34 is activated to advance the ram 54, and the butter block 26, one step. At the same time, the cutter means 40 is activated, in a manner to be described hereinafter, to cut a pat 38 from the block, which pat falls onto the dish 112.

Turning now to a consideration of the ram return means 44, when the ram 54 reaches the end of its advance movement, corresponding to a predetermined number of forward steps, a depending arm 130, FIGS. 3 and 9, on the ram-driver carriage 62 engages a stop 132 on a reciprocal switch actuator 134 which forms part of the control means 52 and which extends substantially the entire length of the machine 20 from the cutting station 36. The depending arm 130 displaces the switch actuator 134 toward the cutting station slightly and, when this occurs, an actuating element 136, FIG. 4, on the opposite end of the reciprocable switch actuator 134 closes switches 138 and 140, the switch 140 being closed by the actuating element 136 through an actuating element 172. The switch 138 energizes the motor 100 while the switch 140 energizes a solenoid 142. As shown in FIG. 7, the armature of the solenoid 142 has pivotally connected thereto an irregularly-shaped arm 144 which is pivotable about a point 146 on the supporting structure 22 and which terminates in a yoke 148 engaging a movable driven member 150 of a clutch 152 having a driving member 154 connected by suitable gearing to the main drive gear 98. The movable driven member 150 of this clutch drives the shaft 80 through a chain 156 trained around suitable sprockets on the driven member 150 and the shaft 80.

With the foregoing construction, when the switches 138 and 140 are closed by the reciprocable switch actuator 134 at the end of the advance stroke of the ram 54, the motor 100 and the solenoid 142 are both energized. The solenoid 142, through the arm 144, engages the clutch 152, and the clutch drives the shaft 80 in a direction to return the ram 54 to its most rearward position. During such return movement of the ram 54, the ram drive means 34, which normally advances the ram 54, is disengaged. (It will be understood that the clutch 152 constitutes a means for disengaging the ram return means 44 during operation of the ram drive means 34 for intermittently advancing the ram 54.) Considering the manner in which the ram drive means 34 is disengaged, the solenoid 142, in addition to pivoting the arm 144 when energized, also longitudinally shifts an irregularly-shaped arm 158 carrying a cam 160, FIG. 15, causing such cam to lift a cam 162 on a lever 164, FIG. 14, pivoted on the structure 22. The lever 164 engages a roller 166 on the pawl 90 to hold this pawl out of engagement with its ratchet wheel 84, as shown in FIG. 14, thereby disengaging the ram drive means 34 during operation of the ram return means 44. (When the solenoid 142 is de-energized, a spring, 168 FIG. 7, associated with the arm 158 disengages the clutch 152 and the cams 160 and 162.)

Continuing to consider the ram return means 44, when the ram 54 reaches its most rearward position, the depending arm 130 on the ram-driver carriage 62 engages a stop 170 on the reciprocable switch actuator 134, at the end thereof adjacent the switches 138 and 140. This shifts the reciprocable switch actuator 134 to the right, as viewed in FIGS 1 and 3, for example, and causes the actuating element 136 to open the solenoid switch 140. This de-energizes the solenoid 142 to disengage the clutch 152 and the cams 160 and 162. However, the motor switch 138 remains closed at this stage, so that the motor 100 continues to operate. The motor 100, through the crosshead 92, the pawl 90 and the ratchet wheel 84, advances the ram 54 until the next butter block 28, which has, meanwhile, dropped into the guideway 37, arrives at the cutting station 36. When this occurs, the motor switch 138 is opened, to de-energize the motor 100, in the manner described in the following paragraph.

As best shown in FIG. 10, the switch actuating element 136 on the reciprocable switch actuator 134, in addition to directly closing the solenoid switch 140, closed the motor switch 138 through the actuating element 172, which is carried by a slidable rod 174 paralleling the reciprocable switch actuator 134. Connected to the actuating element 172 is a finger 176, FIG. 10, which is engageable by one end of a lever 178, FIGS. 9 and 10. As will be apparent, pivoting of the lever 178 in the counterclockwise direction results in displacement of the actuating element 172, through the finger 176, in a direction to close the motor switch 138. Connected to the other end of the lever 178 is a longitudinally slidable rod 180, FIGS. 1 and 9, provided on the end thereof nearest the cutting station 36 with a magnet 182. This magnet is engageable with a disc 184 carried by a longitudinal rod 186 having a longitudinal-lost-motion connection with the ram-driver carriage 62.

With the foregoing construction, as the ram 54 reaches the end of its return stroke, the solenoid 142 is de-energized, in the manner hereinbefore described, to disengage the clutch 152 and the cams 160 and 162. At the same time, the disc 184 engages the magnet 182. During subsequent forward movement of the ram 54 under the control of the motor switch 138, the magnet 182 restrains the disc 184 until the end of the longitudinal-lost-motion connection between the rod 186 and the ram-driver carriage 62 is reached. At this point, the carriage 62, acting through the disc 184 and the magnet 182, pivots the lever 178 sufficiently that it, through the finger 176, causes the actuating element 172 to open the switch 138 controlling the motor 100. This stops the machine 20 with the next butter block 28 in position to be cut by the cutter means 40.

As best shown in FIG. 2, the cutter means 40 comprises a cutter carriage 190 reciprocable vertically on guide rods 192 at the cutting station 36. The cutter carriage 190 is provided on one edge thereof with a vertical rack 194 having meshed therewith a drive gear 196 forming part of the cutter actuating means 42. The gear 196 is meshed with an idler gear 198 which, in turn, is meshed with a gear 200 on a shaft 202 extending substantially the entire length of the dispensing machine 20. The shaft 202 is provided thereon, at its other end, with a gear 204, FIG. 11, meshed with a rack 206 on the crosshead 92.

As will be apparent, each time the crosshead 92 is reciprocated through one complete cycle by the main drive gear 98, the cutter carriage 190 is reciprocated through one complete cycle to cause the cutter means 40 to cut a pat of butter from the butter block 26, this occurring just before the pawl 90 on the crosshead 92, acting on the ratchet wheel 84, advances the ram 54, and the butter block 26 engaged thereby, one step in readiness to have another pat of butter cut from such block.

Referring now to FIGS. 2, 3, 12 and 13 for a more detailed consideration of the cutter means 40, the cutter carriage 190 carries a depending yoke 208, the arms of which carry a cutting wire 210 spanning the space therebetween and adapted, on the downstroke of the cutter carriage, to cut a butter pat 38 from the end of the block 36 which has been projected beyond the end of the guideway 37 by the ram 54. The yoke 208 is connected adjacent its upper end to the cutter carriage 190 by a transverse horizontal pivot pin 212 which permits the cutting wire 210 to move forwardly and rearwardly relative to the butter-block guideway 37. A leaf spring 214 biases the yoke 208 in a direction to displace the cutting wire 210 forwardly relative to the butter-block guideway 37. A latch means 216 acting on the yoke 208 holds the cutting wire 210 in a rearward position until it has virtually completed a cut through the butter block 26 in the process of cutting the butter pat 38, and then releases the cutting wire so that it propels the butter pat away from the remainder of the butter block 26, as suggested in FIG. 12.

Considering the latch means 216, it includes a latch 218 mounted on the yoke 208 by a transverse horizontal pivot and pivotal between a latched position, FIG. 13, and an unlatched position, FIG. 12. When in its latched position, the latch 218 holds the cutting wire 210 in its rearward position. When in its unlatched position, FIG. 12, the latch 218 permits the spring 214 to pivot the cutting wire 210 forwardly to discharge the butter pat 38 forwardly. As shown in FIG. 13, the latch 218 is provided with a surface 220 seated against the spring 214 to hold the cutting wire 210 in its rearward position.

Considering the manner in which the latch 218 is moved between its latched position, FIG. 13, and its unlatched position, FIG. 12, a portion 222 of the supporting structure 22 carries vertically spaced upper and lower stops 224 and 226 which intercept the latch 218 as the cutter carriage 190 approaches the upper and lower ends of its travel. As will be apparent from FIG. 13, when the cutter carriage 190 reaches the upper end of its travel, the latch 218 engages the upper stop 224 to cause the latch surface 220 to engage the spring 214, or any suitable part of the cutter carriage 190, to pivot the latch 218 into its latched position, thereby restraining the cutting wire 210 in its rearward position. On the other hand, at the lower end of the travel of the cutter carriage 190, the latch 218 engages the lower stop 226, as suggested in FIG. 12, to release the yoke 208, whereupon the spring 214 projects the cutting wire 210 forwardly, just as the cut through the butter block 26 is substantially completed, to project the resulting butter pat 38 forwardly and into the dish 112. It will be noted from FIG. 12 that the bottom of the butter-block guideway 37 terminates in a forwardly projecting lip 228 which the cutting wire 210 substantially contacts as it reaches the lower end of its travel and is suddenly displaced forwardly by the spring 214. This lip provides support for the butter pat 38, and insures a clean cut.

It is thought that the operation of the automatic butter-pat dispensing machine 20 of the invention will be clear from the foregoing description. Consequently, a separate explanation of its operation is unnecessary.

Although an exemplary embodiment of the invention has been disclosed herein for purposes of illustration, it will be understood that various changes, modifications and substitutions may be incorporated in such embodiment.

I claim as my invention:

1. In an automatic machine for dispensing pats of butter from elongated blocks thereof, the combination of:
   (a) a magazine adapted to contain a stack of elongated blocks of buter with the blocks horizontal;
   (b) ram means engageable with one end of the lowermost block of butter in said magazine;
   (c) ram drive means for advancing said ram means horizontally from an initial position toward a cutting station in a step-by-step manner so as to advance a block of butter engaged by said ram means from said magazine toward said cutting station in a step-by-step manner;
   (d) cutter means at said cutting station for cutting a pat of butter from an end of a block advanced to said cutting station by said ram means;
   (e) cutter actuating means for actuating said cutter means;
   (f) ram return means for returning said ram means to said initial position to engage the next lowermost block of butter in said magazine;
   (g) electric motor means for operating said ram drive means, said cutter actuating means and said ram return means; and
   (h) selector means for causing said electric motor means to operate said cutter actuating means and said ram drive means at the end of a step of advance movement of said ram means, and to operate said ram return means at the end of a predetermined number of steps of advance movement of said ram means.

2. An automatic butter-pat dispensing machine as defined in claim 1 wherein said selector means includes:
   (a) manually operable control means at said cutting station for causing said electric motor means to operate said cutter actuating means and said ram drive means; and
   (b) another control means responsive to a predetermined number of steps of advance movement of said ram means for causing said electric motor means to operate said ram return means.

3. An automatic butter-pat dispensing machine according to claim 2 wherein said manually operable control means includes a rotary switch actuator, and manually operable ratchet-and-pawl means for rotating said rotary switch actuator in a step-by-step manner.

4. An automatic butter-pat dispensing machine according to claim 2 wherein said other control means includes a reciprocable switch actuator and means for shifting same longitudinally at the end of said predetermined number of steps of advance movement of said ram means.

5. An automatic butter-pat dispensing machine as defined in claim 1 wherein said selector means includes means for engaging and disengaging said ram drive means and another means for engaging and disengaging said ram return means.

6. An automatic butter-pat dispensing machine according to claim 5 wherein said ram drive means include ratchet-and-pawl means, and wherein said means for engaging and disengaging said ram drive means comprises means for engaging and disengaging said ratchet-and-pawl means.

7. An automatic butter-pat dispensing machine as defined in claim 6 wherein said means for engaging and disengaging said ram return means includes clutch means.

8. An automatic butter-pat dispensing machine according to claim 7 wherein said selector means includes solenoid-operated means for disengaging said ratchet-and-pawl means for engaging said clutch means.

9. An automatic butter-pat dispensing machine according to claim 1 wherein said ram drive means and said cutter actuating means include:
(a) eccentric means connected to and driven by said electric motor means;
(b) ratchet-and-pawl means comprising a rotatable ratchet and a reciprocable pawl engageable with said ratchet and connected to said eccentric means;
(c) means connecting said ratchet to said ram means; and
(d) means connecting said cutter means to said eccentric means.

10. An automatic butter-pat dispensing machine as defined in claim 1 wherein said cutter means includes a reciprocable cutter frame movable transversely of a block of butter at said cutting station and carrying a cutting element, said cutter means further including means for moving said cutter frame away from the block of butter as said cutting element completes a cut therethrough so as to displace the resulting butter pat away from the block of butter.

References Cited
UNITED STATES PATENTS 2,529,850    11/1950    Scharsch    31—6
3,144,715    8/1964    Page    31—5X HUGH R. CHAMBLEE, Primary Examiner U.S. Cl. X.R.
31—20